(12) United States Patent
Sahm

(10) Patent No.: US 8,578,622 B2
(45) Date of Patent: Nov. 12, 2013

(54) ALIGNMENT DEVICE

(75) Inventor: Detlef Sahm, Lichtenwald (DE)

(73) Assignee: Sauter Feinmechanik GmbH, Metzingen (DE)

( * ) Notice: Subject to any disclaimer, the term of this patent is extended or adjusted under 35 U.S.C. 154(b) by 152 days.

(21) Appl. No.: 13/261,138

(22) PCT Filed: Feb. 1, 2010

(86) PCT No.: PCT/EP2010/000578
§ 371 (c)(1),
(2), (4) Date: Jan. 31, 2012

(87) PCT Pub. No.: WO2011/015253
PCT Pub. Date: Feb. 10, 2011

(65) Prior Publication Data
US 2012/0131809 A1 May 31, 2012

(30) Foreign Application Priority Data
Jul. 18, 2009 (DE) .......................... 10 2009 033 805

(51) Int. Cl.
*G01D 21/00* (2006.01)
(52) U.S. Cl.
USPC .............................................. 33/645; 33/613
(58) Field of Classification Search
USPC .................... 33/613, 645, 533, 520, 529, 412
See application file for complete search history.

(56) References Cited

U.S. PATENT DOCUMENTS

| | | | | |
|---|---|---|---|---|
| 5,920,999 A * | 7/1999 | Hutter | ............................. | 33/645 |
| 6,151,793 A * | 11/2000 | Carlen | ............................. | 33/645 |
| 6,411,375 B1 * | 6/2002 | Hinkle et al. | .................... | 33/645 |
| 7,242,465 B2 * | 7/2007 | Lacko et al. | ..................... | 33/645 |
| 7,409,775 B2 * | 8/2008 | Kuhman et al. | ................. | 33/645 |
| 7,716,846 B2 * | 5/2010 | Sanders | ........................... | 33/517 |
| 7,971,328 B2 * | 7/2011 | Sahm et al. | ........................ | 29/40 |
| 8,006,593 B2 * | 8/2011 | Sahm et al. | ..................... | 82/158 |
| 8,037,615 B2 * | 10/2011 | Glaser | ............................. | 33/286 |
| 2009/0090226 A1 * | 4/2009 | Sahm et al. | ..................... | 82/159 |
| 2012/0131809 A1 * | 5/2012 | Sahm | ............................. | 33/645 |

FOREIGN PATENT DOCUMENTS

DE 39 29 802 11/1990
DE 195 48 151 7/1997

(Continued)

*Primary Examiner* — Yaritza Guadalupe-McCall
(74) *Attorney, Agent, or Firm* — Roylance, Abrams, Berdo & Goodman LLP

(57) ABSTRACT

The invention relates to an alignment device for the aligned and detachable fixing of at least one functional component (10), in particular in the form of a tool holder, to a further functional component (12), in particular in the form of a tool disk, around at least one alignment axis (14), wherein the two functional components (10, 12) have in each case at least one contact face (16, 18) for mutual contact with each other. Said alignment device is characterized in that both the one and the further functional component (10, 12) have at least one alignment part (22, 24), in that the respective alignment part (22) of the one functional component (10) is a constituent part of an alignment element (30) and forms an alignment face (26), which can be brought into at least partial contact with a positioning face (28) of the associated alignment part (24) of the further functional component (12) with a predefinable alignment force, and in that the predefinable alignment force is formed by the preload which is produced by a resilient deflection of the part (36) forming the respective alignment face (26) relative to the remaining part (34) of the alignment element (30), taking place as the functional components (10, 12) are fixed to each other.

9 Claims, 3 Drawing Sheets

(56) References Cited

FOREIGN PATENT DOCUMENTS

| DE | 199 58 461 | 3/2001 |
| DE | 10 2005 045 662 | 3/2007 |
| DE | 10 2008 048 206 | 4/2010 |
| EP | 0 962 280 | 5/2003 |
| EP | 1 992 435 | 11/2008 |
| WO | WO 2007/031145 | 3/2007 |

* cited by examiner

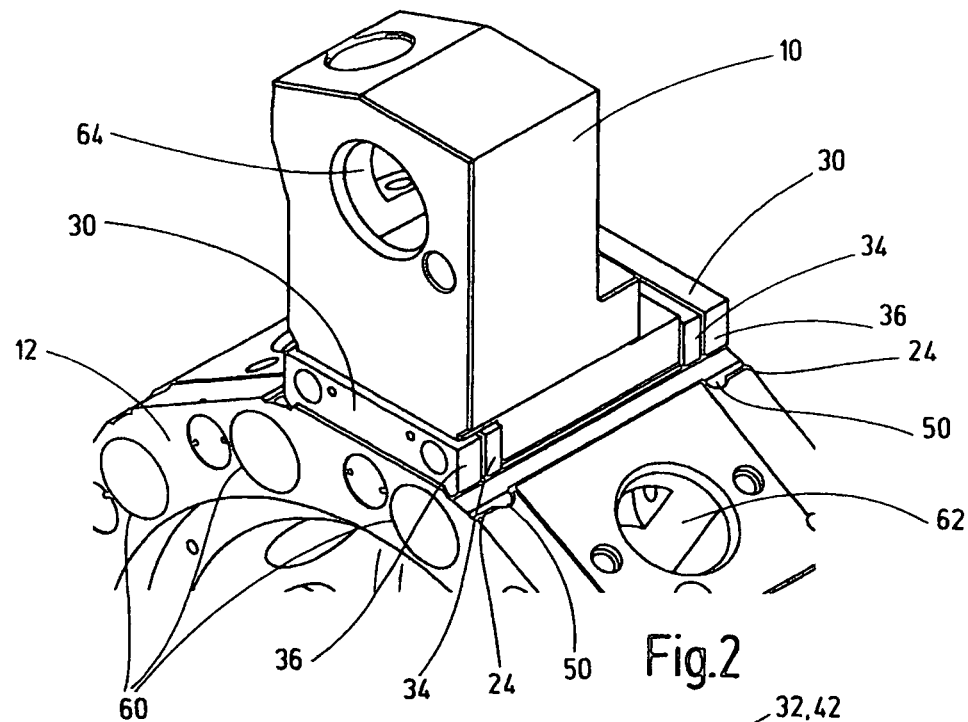
Fig. 2
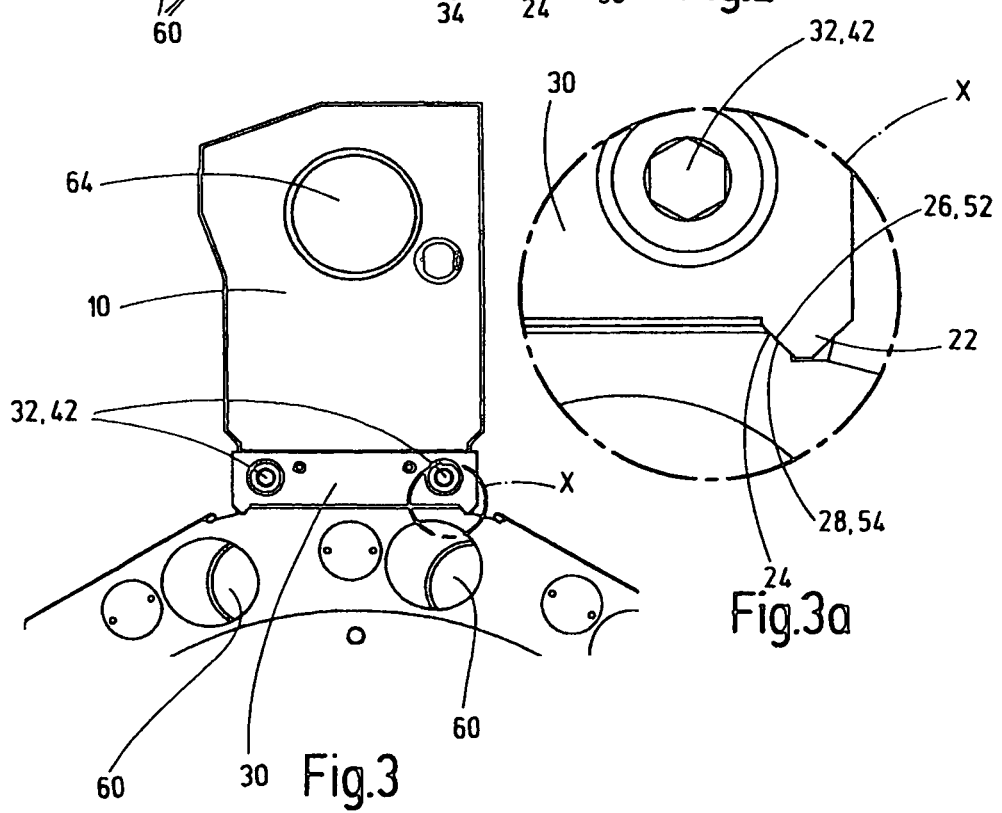
Fig. 3
Fig. 3a

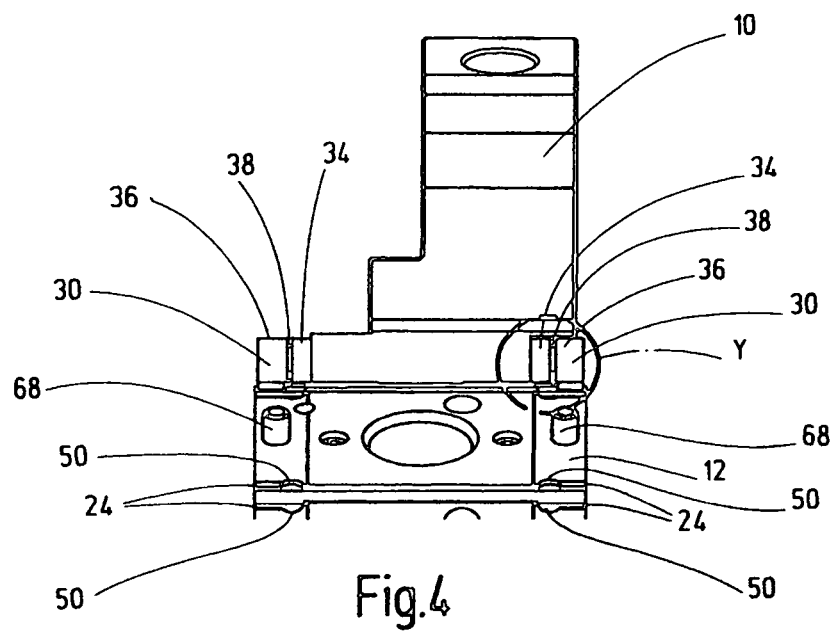
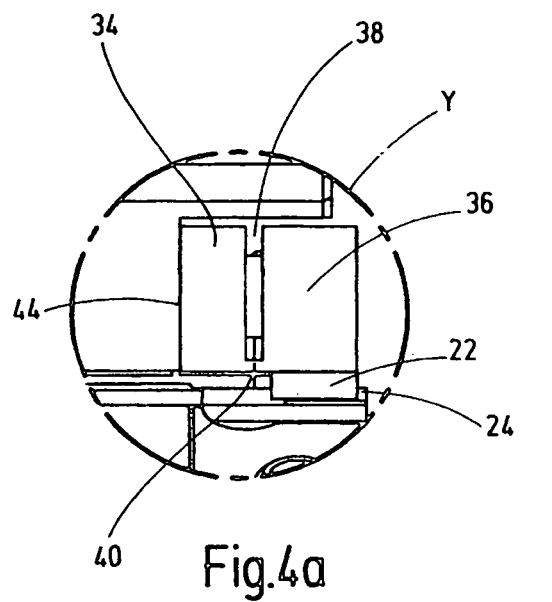 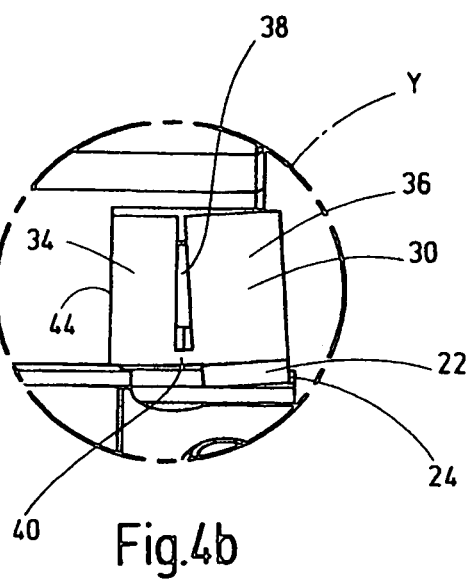

ALIGNMENT DEVICE

The invention relates to an alignment device for aligned and detachable securing of at least one functional component, in particular in the form of a tool holder, on another functional component, in particular in the form of a tool disk, around at least one alignment axis, wherein the two functional components each have at least one contact surface for mutual contact with one another.

Tool disks of this type are used in the industrial production of so-called tool turrets of machine tools. If several tool holders with the pertinent tools (for example, stationary turning tools or drivable milling tools) are mounted over the periphery of the tool disk, this arrangement by turning allows very rapid changing of the tools which are necessary for the respective machining. Since usually only very small production tolerances are allowed in the machining of workpieces, a reproducibly defined positioning of the tool holders and thus of the tools relative to the tool disk is essential for an efficient use of these tool turrets.

EP 0 962 280 B1 discloses an alignment device for the relative positioning of a tool holder relative to a tool holder receptacle for machine tools in the form of a pivoting motion with an alignment part, which interacts with a setting part, wherein the setting part is provided with a receiving housing, by a guide part for the alignment part, which can be moved lengthwise, being an actuating part. Preferably, it is provided in the known solution that the journal-shaped alignment part is located stationary on the tool holder receptacle of the tool disk, and the setting part is located stationary on the tool holder which is to be positioned. With the known solution, the alignment and setting process for the tool holder can be effectively undertaken by hand via a single actuating part.

WO 2007/031145 A1 discloses a tool turret, in particular for machine tools, with a tool disk which can be turned around a turret axis, which has a plurality of tool stations which are distributed along its periphery and which can be set into at least one working position by turning the tool disk, on at least some of the tool stations there being a receiver for a tool holder and there being one fastening means each to secure a respective tool holder on a pertinent receiver in defined positioning. In that in the known solution for the positioning there are provided as alignment means at least one fitting body which projects out of the receiver and which is elastically flexible perpendicularly to the latter, and fitting surfaces which are recessed in a base surface of the tool holder for interaction with the at least one fitting body, in the known solution, the result is that, when the tool holder is fastened to the tool station with the fastening means, the desired setting position is assumed.

The German patent application of the same applicant, DE 10 2008 048 206.4, which is unpublished to date, discloses a solution in which elastically flexible fitting bodies are made in the form of an "insert" and are integrated in a receiving surface of the tool disk such that the respective fitting body in turn projects out of the insert receiver of the tool disk. The elastic flexibility for the fitting body is implemented by way of a slot configuration in an expansion body which forms the insert and which comprises the elastic carrier for the fitting body.

With the latter two known solutions, a relatively exact positioning of two functional components can be implemented in the form of a tool holder relative to a tool disk.

On the basis of this prior art, the object of the invention is to provide an alignment device which, as shown in the indicated prior art, ensures an exact relative positioning of two functional components, such as a tool holder and a tool disk, and, moreover, is characterized by a simple, economical, as well as reliable design.

According to the invention, this object is achieved by an alignment device having the features specified in claim 1 in its entirety. In that, according to the characterizing part of claim 1, both one and also the other functional component have at least one alignment part and—brought in paired interaction with one another—undertake a relative positioning of the two functional components around at least one alignment axis, a defined relative positioning of one functional component, especially in the form of a tool holder, on another functional component, especially a tool disk, is ensured. In that one functional component and the other functional component already have the alignment means necessary for the relative positioning, it is possible to essentially dispense with additional positioning aids, such as shown, for example, in EP 0 962 280 B1.

In exemplary embodiments in which the respective alignment part, which can be assigned to one functional component, is part of an independent alignment body, the production of the alignment bodies which requires high precision can proceed separated from the production of the one functional component, and less stockpiling of functional components is necessary since only the individual functional components which are necessary in a working process need be provided with alignment bodies. In particular, these alignment bodies can also be suitably retrofitted in existing systems.

In that the respective alignment surface of one functional component can be moved into at least partial contact with one positioning surface of the alignment part of the other functional component with a definable alignment force, the definable alignment force being formed by a preload which is produced by an elastic deflection of the part of the alignment body which forms the respective alignment surface, the relative position of one functional component with respect to the other functional component is reliably achieved, for example, around the alignment axis which runs perpendicular to the axis of the tool turret.

In the solution according to the invention, the alignment body can be made as an integrated component of at least one of the two functional components; but it is preferably provided that the alignment bodies be designed as add-on bodies for one functional component at a time in the form of the tool holder in order to be able to retrofit systems already on the market.

In one preferred exemplary embodiment, the respective alignment body is made strip-shaped and on its free opposite end regions has one alignment part each with the alignment surface. To provide four alignment bodies, which are located diametrically to the alignment axis on one functional component, it is sufficient to mount two such alignment bodies on one functional component, for example, on opposite sides of one functional component, by providing a pair of alignment parts on the strip-shaped alignment body.

In one preferred exemplary embodiment, the strip-shaped alignment body is slotted with the formation of two interconnected strip bodies, and one strip body, which has the respective alignment part, can be deflected against the elastic force relative to the other strip body, which can be connected to one functional component by means of a connecting device. It is achieved, for example, by the slot between the two interconnected strip bodies being made sufficiently deep so that an elastically deformable bridge is established between the two strip bodies.

In one preferred exemplary embodiment, the respective alignment part is detachably connected to one functional component by a connecting device. In this case, a screw shaft can, for example, be provided for the connecting device. Said screw shaft, which is made in a bore of the alignment part, can be screwed into a pertinent threaded bore of one functional component, and pressing of the alignment part against the functional group is ensured by contact of the screw head with one section of the alignment part.

In another exemplary embodiment, the alignment part of the alignment body is formed by a cam which, in the functional position, is raised off the alignment body in the direction of the contact surface of the other functional component. The cam, which is preferably made triangular in cross section, with one side of the triangular shape adjoins the alignment body, while the free tip of the triangle is oriented in the direction of the contact surface of the other functional component. In this case, there are alignment surfaces on one of the two exposed sides of the triangular cam. The alignment surfaces can run in one plane at a time or can be made crowned.

In one preferred embodiment, it is provided that the respective alignment part of the other functional component with its positioning surface is preferably an integral component of this functional component and that the respective positioning surface, which is located in the direction of a depression, extends between two contact surfaces of the other functional components. Alternatively or in addition thereto, it can be provided that there be the respective alignment part of the other functional group on the edge side on one edge of the contact surface of the other functional component, which edge is made transversely to the direction of the axis of the tool turret.

In one preferred exemplary embodiment of the invention, the alignment surface and the positioning surface of one pair of alignment parts are made as oblique surfaces of the same inclination. In another preferred exemplary embodiment of the invention, the alignment surface and/or the positioning surface have/has a crowned contour.

In one preferred exemplary embodiment, it is provided that one functional component with a retaining part extending through the contact surface of the other functional component engages the latter and is secured in its functional position by means of a detachable locking device such that the alignment parts, which interact in pairs, are held on one another with a preload. Examples for these types of retaining parts and detachable locking devices are precision interfaces in accordance with DIN 69880.

In one especially preferred exemplary embodiment, the preload with which the alignment parts are held on one another in the functional position is chosen such that the alignment means located in pairs on one strip body with their alignment surfaces, relative to the assigned positioning surfaces of the alignment parts of the other functional component, undergo a tilt which adjusts this strip body to the other strip body in an oblique position.

The invention is detailed below using exemplary embodiments shown in the drawings.

FIG. 2 is a perspective and dismounted oblique view of a peripheral section of the tool disk with the tool holder located on the tool disk;

FIG. 3 is a side view in the direction of the axis of the tool turret of a peripheral section of the tool disk with the tool holder located on the tool disk;

FIG. 3a is an enlarged extract of the circle bordered with X in FIG. 3, which depicts the mutual position of a pair of alignment parts of the tool holder and the tool disk, which pair of parts is assigned to one another;

FIG. 4 is a side view in a direction transverse to the axis of the tool turret with a tool holder which is located in a peripheral section of the tool disk, wherein the state before the actual fastening of the tool holder to the tool disk is shown;

FIG. 4a is an enlarged extract of the circle bordered with Y in FIG. 4;

FIG. 4b is a representation similar to FIG. 4a, but for the state in which the tool holder is secured on the tool disk.

Figure 1:
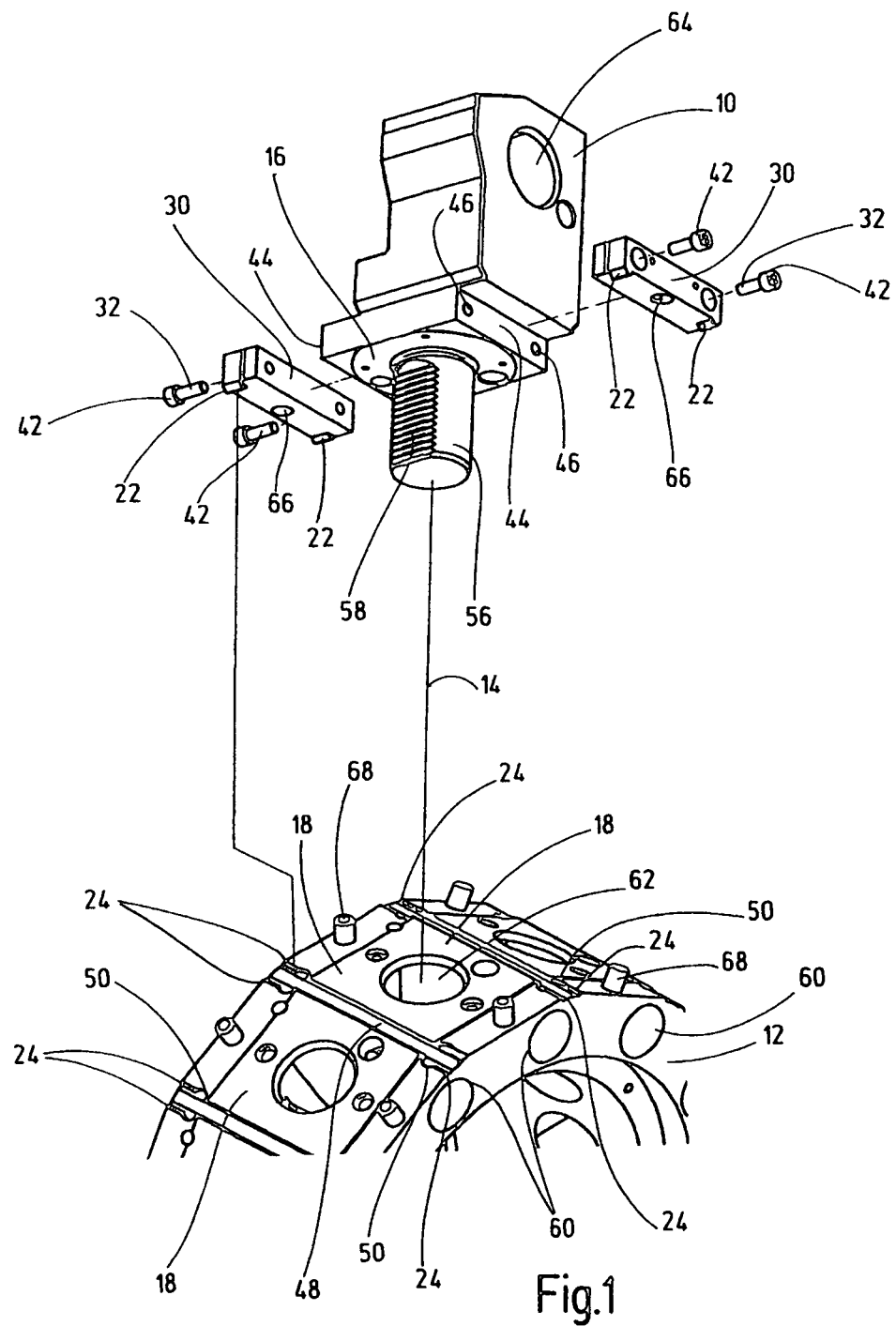
FIG. 1 is a perspective, detached, and exploded oblique view of a peripheral section of the tool disk of a tool turret, wherein a tool holder in position raised off the holder receptacle on the tool disk is shown.

FIG. 1 is an exploded view of the alignment device according to the invention for aligned and detachable securing of at least one functional component 10, in particular in the form of a tool holder, on another functional component 12 in the form of a tool disk, around at least one alignment axis 14, which extends in the direction of looking at FIG. 1 in a vertical alignment. The two indicated functional components, in the periphery of the tool holder 10 as well as the tool disk 12 on their sides adjacently facing one another, have one contact surface 16, 18 each for mutual contact in the state secured to one another, as is shown, for example, in FIG. 2.

Outside the respective contact surface 16, 18, which otherwise extends perpendicularly to the alignment axis 14, both one and also the other pertinent functional component have alignment parts 22, 24 which—dynamically connected with one another in pairs (cf. FIG. 2)—effect a relative positioning of the two functional components in the form of the tool holder 10 relative to the tool disk 12 around at least one alignment axis 14.

Here the respective alignment part 22 of the tool holder 10 has an alignment surface 26 which can be moved by a definable alignment force into at least partial contact with a positioning surface 28 of the assignable alignment part 24 of the tool disk 12 as another functional component (cf. FIG. 3, 3a in this respect). As furthermore follows from FIG. 1, a total of four pairs of alignment parts 22, 24 are located diametrically to a vertically running alignment axis 14 and border the respective contact surface 16, 18 on the edge side. In this way, a good angle alignment of the tool holder 10 relative to the holder receptacle of the tool disk 12 around the indicated major axis 14 can be achieved in the precision adjustment range.

The respective alignment part 22, which can be assigned to the tool holder 10 as a functional component, is a component of an independent alignment body 30, which can be connected to the tool holder 10 by mean of a connecting device 32. The respective alignment body 30 is made strip-shaped and on its free opposite end regions respectively has the alignment part 22 with the alignment surface 26. The strip-shaped alignment body 30 is made slotted with formation of two interconnected strip bodies 34, 36, one strip body 36, which has the respective alignment part 22, being movable to a certain extent relative to the other strip body 34, which can be connected to the tool holder 10 (cf. FIGS. 4a, 4b). The alignment body 30 is designed as a cuboidal component through which a groove 38 extends from the top; said groove, viewed in the direction of looking at FIGS. 4a, 4b, discharges downward into a type of bridge 40 as a connecting brace which extends parallel to the two strip bodies 34, 36 over the entire length of the alignment body 30 and forms a type of bending articulation via which the strip body 36 can be adjusted to the strip body 34 with elastic deflection around this bending site. For this adjustment process, the connecting device 32 has engagement screws 42 which act in pairs and which extend through the respective alignment body 30 such that the respective screw head of the engagement screw 42 makes exclusive contact with the first strip body 34 in order to move the first strip body 34 into planar contact with a respectively assigned receiving surface 44 of the tool holder 10, the indicated screws 42 with their threaded length then being engaged to assignable threads 46 in the tool holder 10 (cf. FIG. 1). As a result, the through bore for the respective engagement screw 42 in the second strip body 36, which is to be adjusted, is therefore kept larger than the diameter of the screw head in order to enable in this way unimpeded engagement of the screw 42 with the assigned thread 46 in the tool holder 10.

The respective alignment part 24 of the tool disk 12 as the other functional component with its positioning surface 28 is an integral component of the tool disk 12, the respective positioning surface 28 located in the direction of a depression 48 extending between two adjacent contact surfaces 18 of the tool disk 12. The respective depression 48 is made as a longitudinal groove which extends from the front face side of the tool disk toward its rear side. The alignment parts 24 border the respective depression 48 in their free end region, which discharges to the outside, the respective alignment part 24 being recessed by recesses 50 from the remaining longitudinal guide of the depression 48 in order to avoid geometrical overdeterminations when the alignment parts 22, 24 adjoin one another in pairs. Therefore, it is to be ensured that at least the alignment parts 22, 24, which are assigned to one another, come into direct contact with one another and cannot be supported on other third components. As especially FIGS. 3 and 3a show, for this purpose, it is furthermore provided that the alignment surface 26 and the assigned positioning surface 28 of one pair of adjacent alignment parts 22, 24 are made as oblique surfaces 52, 54 of the same slope. In one preferred configuration, it can also be provided that at least one oblique surface 52 runs slightly crowned in order to enable in this way surface contact with the other oblique surface 54.

As FIG. 1 furthermore shows, the first functional component in the form of the tool holder 10 in the middle of the contact surface 16, which in this respect is made circular, has a holder which projects downward in the manner of a journal as retaining part 56, which, facing the observer, has a toothed surface 58 which can be engaged by a corresponding clamping piece with its toothing (not shown); said piece—supplied via a feed bore 60 and screwed down accordingly—draws the retaining part 56, viewed downward in the direction of looking at FIG. 1, into the pertinent receiver 62, which extends through the center of contact surface 18 to effect a firm contact of the holder 10 against the tool disk 12, as is shown, for example, in FIG. 2. This locking engagement is conventional and is, for example, the subject matter of DIN 69880. With tightening of the locking device, a substantial tightening force is applied via the retaining part 56 to the holder 10 in the direction of the tool disk 12 so that under high contact pressure the two corresponding contact surfaces 16, 18 come into contact with one another with the incorporation of the alignment parts 22, 24, which interact in pairs, wherein the alignment part 24 of the tool disk 10 lifts the alignment part 22, which engages in this respect via the contact surface 18 in the direction of the recess 48, with the result that according to FIG. 4b, the strip body 36 experiences an adjustment motion to the strip body 34 so that a preload which acts as alignment force is established via the bridge 40. Said bridge is then preloaded, with the result that a positioning likewise takes place in the displacement direction transversely to the alignment axis 14; this time in a deflected manner.

In that the alignment parts 22, which are located in pairs on the strip body 36 with their alignment surfaces 26 relative to the assigned positioning surfaces 28 of the alignment parts 24 of the tool disk 12, undergo a tilt which adjusts this strip body 36 to the other strip body 34, between the indicated surfaces 26, 28 an oblique position arises, viewed in the direction to the two contact surfaces 16, 18 which are in contact with one another, so that in the region of the alignment parts the surface contact is reduced, resulting in increased surface pressure; this, on the one hand, raises the calibration forces.

As shown in FIG. 1, the retaining part 56 is made as a solid engagement journal so that the tool holder 10 acquires the function of accommodating a stationary tool (not shown) which can be accommodated, for example, in the manner of a turning tool holder in a holder receptacle 64 of the holder 10. But it is also easily possible, in one embodiment which is not detailed, to design the retaining part 56 as a possible penetration for a drive shaft of a turning tool as is shown, for example, in FIG. 1 of EP 0 962 280 B1. Furthermore, the alignment parts 22 in the form of the alignment body 30 can be an integral component of the tool holder 10; but it is preferably provided that these alignment bodies be made as so-called retrofit parts, i.e., as shown, the alignment bodies 30 can be retrofitted onto existing, delivered tool disk systems. For this retrofitting, the alignment body 30, roughly in the middle on the underside of the frontmost strip body 36, has a center bore 66 which is kept larger in diameter than a receiving or setup journal 68 which, located on the face sides of the tool disk 12, extends in the middle with projection between two adjacent groove-shaped depressions 48 and is used to accommodate a spring-centered alignment part, as is likewise the subject matter of the alignment device according to EP 0 962 280 B1. In this respect, this known system can be easily interchangeably replaced by the new strip body system.

The invention claimed is:

1. An alignment device for aligned and detachable securing of at least one functional component (10), in particular in the form of a tool holder, on another functional component (12), in particular in the form of a tool disk, around at least one alignment axis (14), wherein the two functional components (10, 12) each have at least one contact surface (16, 18) for mutual contact with one another, characterized in that both one and also the other functional component (10, 12) have at least one alignment part (22, 24); that the respective alignment part (22) of one functional component (10) is part of an alignment body (30) and forms an alignment surface (26) which can be moved into at least partial contact with one positioning surface (28) of the assignable alignment part (24) of the other functional component (12) with a definable alignment force; and that the definable alignment force is formed by a preload which is produced by an elastic deflection of the part (36) which forms the respective alignment surface (26), which deflection takes place when the functional components (10, 12) are secured on one another, relative to the other part (34) of the alignment body (30).

2. The alignment device according to claim 1, characterized in that the alignment body (30) is an independent component and is made strip-shaped and on its free opposite end regions has one alignment part (22) each with the alignment surface (26).

3. The alignment device according to claim 2, characterized in that the strip-shaped alignment body (30) is slotted with the formation of two interconnected strip bodies (34, 36) and that one strip body (36), which has the respective alignment part (22), can be deflected against the elastic force relative to the other strip body (34), which can be connected to one functional component (10) by means of a connecting device (32).

4. The alignment device according to claim 1, characterized in that at least two pairs, but preferably four pairs of alignment parts (22, 24) are arranged diametrically to one alignment axis (14).

5. The alignment device according to claim 1, characterized in that the respective alignment part (24) of the other functional component (12) with its positioning surface (28) is preferably an integral component of this functional component (12).

6. The alignment device according to claim 5, characterized in that the respective positioning surface (28) located in the direction of a depression (48) extends between two contact surfaces (18) of the other functional component (12).

7. The alignment device according to claim 1, characterized in that the alignment surface (26) and the positioning surface (28) of one pair of alignment parts (22, 24) are made as oblique surfaces (52, 54) of the same slope or as surfaces which are arched with same curvature.

8. The alignment device according to claim 1, characterized in that one functional component (10) with a retaining part (56), extending through the contact surface (18) of the other functional component (12), engages the latter and in its functional position is secured by means of a detachable locking device such that the alignment parts (22, 24), which interact in pairs, are held on one another under a force which produces the elastic deflection of the alignment surfaces (26) and the preload between the latter and the positioning surfaces (28).

9. The alignment device according to claim 8, characterized in that the preload is chosen so that the alignment parts (22), which are located in pairs on one strip body (36), with their alignment surfaces (26) relative to the assigned positioning surfaces (28) of the alignment parts (24), undergo a tilt which adjusts this strip body (36) to the other strip body (34) in an oblique position.

* * * * *